(12) United States Patent
Wakui

(10) Patent No.: US 7,054,248 B2
(45) Date of Patent: May 30, 2006

(54) RECORDING APPARATUS

(75) Inventor: Tetsuya Wakui, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 452 days.

(21) Appl. No.: 10/366,825

(22) Filed: Feb. 14, 2003

(65) Prior Publication Data

US 2003/0161236 A1 Aug. 28, 2003

(30) Foreign Application Priority Data

Feb. 25, 2002 (JP) .................................. 2002-047904

(51) Int. Cl.
*G11B 7/00* (2006.01)

(52) U.S. Cl. .................. 369/47.36; 369/47.44; 369/53.1

(58) Field of Classification Search ........... 369/47.1, 369/47.36, 47.44, 53.1, 47.39, 53.2, 53.42, 369/59.1, 44.32

See application file for complete search history.

(56) References Cited

U.S. PATENT DOCUMENTS

| | | | |
|---|---|---|---|
| 5,161,070 A | * | 11/1992 | Muramoto et al. ........ 360/74.1 |
| 5,684,763 A | | 11/1997 | Kurita et al. |
| 5,894,459 A | * | 4/1999 | Kurita et al. ............ 369/13.02 |
| 5,982,570 A | | 11/1999 | Koizumi et al. |

FOREIGN PATENT DOCUMENTS

| | | |
|---|---|---|
| EP | 0 429 264 A2 | 5/1991 |
| EP | 0 982 950 A2 | 3/2000 |
| JP | 07-334950 | 12/1995 |
| JP | 08-124279 | 5/1996 |
| JP | 11-025661 | 1/1999 |
| JP | 11-155188 | 6/1999 |
| JP | 2000-152049 | 5/2000 |
| JP | 2001-008073 | 1/2001 |
| WO | WO 98/27549 A2 | 6/1998 |

* cited by examiner

*Primary Examiner*—Muhammad Edun
(74) *Attorney, Agent, or Firm*—Cowan, Liebowitz & Latman, P.C.

(57) ABSTRACT

A recording apparatus having a microphone unit; and a drive unit adapted to drive a disk medium on which sound collected by the microphone unit is to be recorded. The recording apparatus is capable of changing a rotational speed of the drive unit in accordance with a level of the sound collected by the microphone unit.

16 Claims, 4 Drawing Sheets

RECORDING APPARATUS

BACKGROUND OF THE INVENTION

1. Field of the Invention

The present invention relates to a recording apparatus for recording sounds on a disk medium.

2. Related Background Art

One of the apparatuses available for recording images and sounds on a disk medium, such as a magnetic disk or an optical disk, is a digital video camera.

One problem encountered when a disk medium is used for recording images and sounds is the noise generated by a recording unit (e.g., the mechanical noise produced by a motor and the air-resistance noise produced by a spinning disk medium). Since the memory capacity of a disk medium employed in a digital video camera is large, its diameter, especially, is large, and accordingly, the amount of noise generated by the recording unit is large. Further, conditions are frequently encountered wherein the level of the noise generated by a recording unit exceeds the level of sounds collected by a built-in microphone unit, so that high quality sound recording is not possible.

SUMMARY OF THE INVENTION

An object of the present invention is to overcome the above mentioned drawbacks.

Another object of the present invention to reduce the noise generated during recording so as to record high quality sounds.

To achieve these objects, according to one aspect of the present invention, a recording apparatus comprises:

a microphone unit; and drive means for driving a disk medium on which sounds collected by the microphone unit are to be recorded, wherein the recording apparatus is capable of changing a rotational speed of the drive unit in accordance with a level of the sound collected by the microphone unit.

According to another aspect of the invention, a recording apparatus comprises:

a first microphone unit;

a drive unit adapted to drive a disk medium on which sound collected by the first microphone unit is to recorded; and a second microphone unit for collecting noise generated by the drive unit, wherein the recording apparatus is capable of changing a rotational speed of the drive means in accordance with a level of the sound collected by the first microphone unit and a level of the noise collected by the second microphone unit.

According to a further aspect of the invention, rotational speed changing method is used in a recording apparatus including a first microphone unit, a drive unit adapted to drive a disk medium on which sound collected by the first microphone unit is to be recorded, and the rotational speedc changing method comprises:

a changing step of changing a rotational speed of the drive unit in accordance with a level of the sound collected by the microphone unit.

According to still a further aspect of the invention, a rotational speed changing method is used in a recording apparatus including a first microphone unit, a drive unit adapted to drive a disk medium on which sound collected by the first microphone unit is to be recorded, and a second microphone unit for collecting noise generated by the drive unit, and the rotational speed changing method comprises:

a changing step of changing a rotational speed of the drive unit in accordance with a level of the sound collected by the first microphone unit and a level of the noise collected by the second microphone unit.

Still other objects, features and advantages of the present invention will become fully apparent during the course of the following detailed description, given for the preferred embodiments.

DETAILED DESCRIPTION OF THE PREFERRED EMBODIMENTS (First Embodiment)

Figure 1:
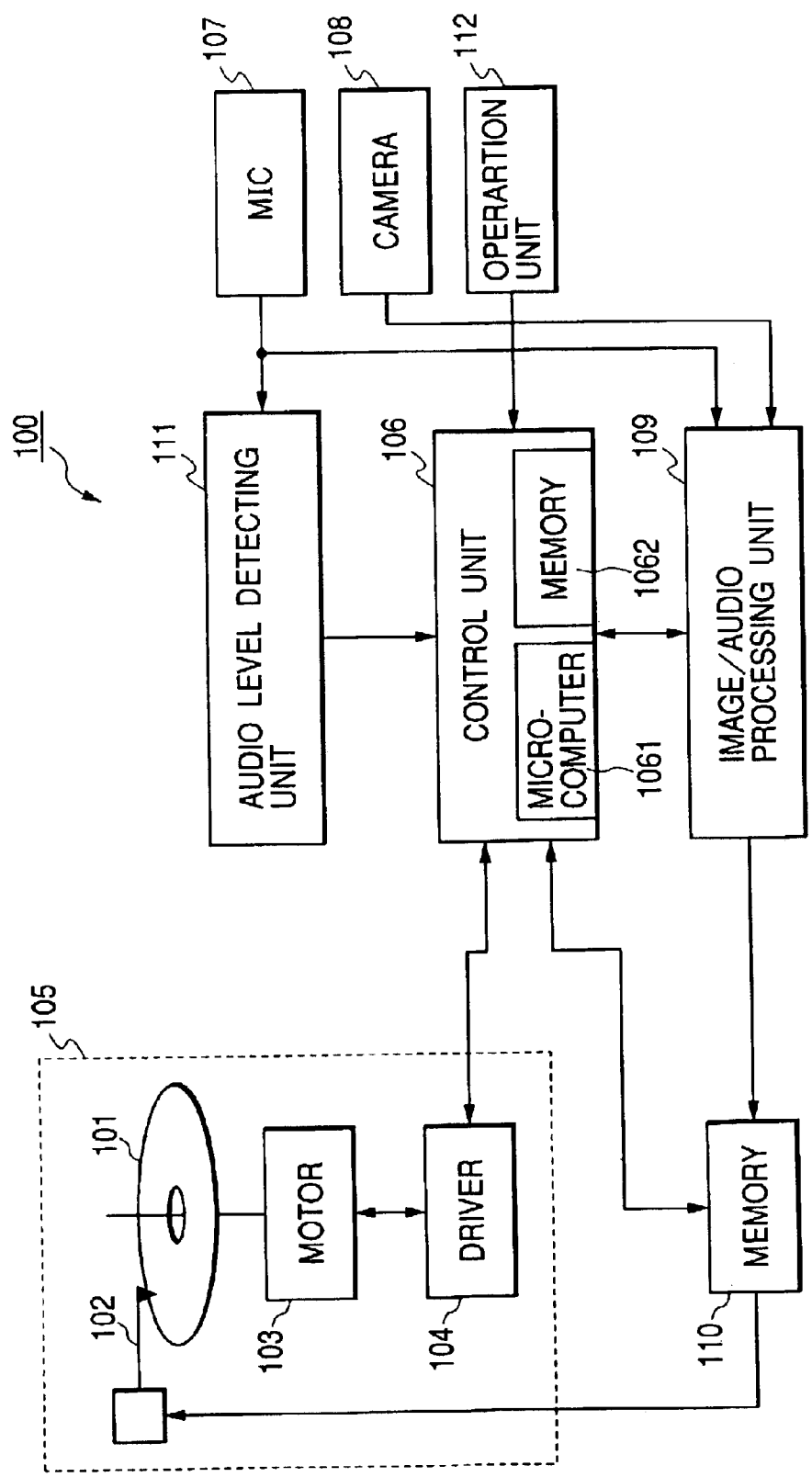
FIG. 1 is a diagram showing the essential configuration of a recording apparatus according to a first embodiment of the present invention.
Figure 2:
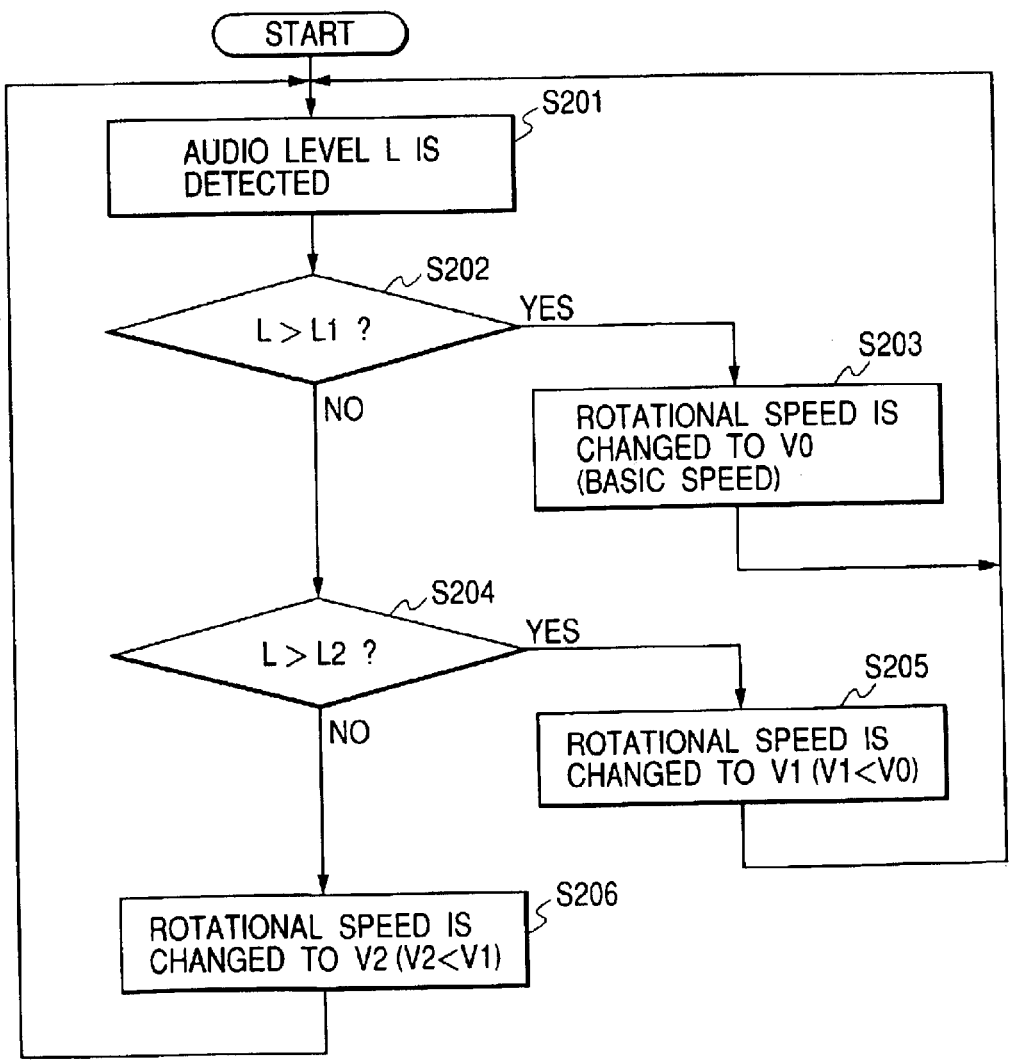
FIG. 2 is a flowchart showing the processing performed by the recording apparatus in FIG. 1.

A recording apparatus according to a first, preferred embodiment of the present invention will now be described while referring to FIGS. 1 and 2.

First, the essential configuration of the recording apparatus in the first embodiment will be described while referring to FIG. 1.

A digital video camera (hereinafter referred to as a DVC) 100 is a preferred recording apparatus for the first embodiment.

A recording unit 105 includes a disk medium 101 such as a magnetic disk or an optical disk, a recording head 102, a spindle motor 103 and a driver 104. The recording head 102 records video data and audio data on the disk medium 101, which is rotated by the spindle motor 103. For the spindle motor 103, the driver 104 controls the rotational speeds, which include a standard speed V0, a first low speed V1, slower than the standard speed V0, and a second low speed V2, slower than the first low speed V1. A function of the driver 104 provides for the changing of the rotational speed of the spindle motor 103 in accordance with the noise level (e.g., the noise produced by the spindle motor 103 and the air-resistance noise produced by a spinning disk medium 101) generated by the recording unit 105.

A control unit 106 including a microcomputer 1061 and a memory 1062 controls various functions of DVC 100. A control program to be executed by the control unit 106 is stored in the memory 1062 of the control unit 106, and a control program that implements the processing in FIG. 2 is also stored in the memory 1062 of the control unit 106.

A microphone unit 107 collects external sounds, a camera unit 108 takes in images and a video/audio processing unit 109 converts the sounds collected by the microphone unit 107 and the images obtained by the camera unit 108 to obtain video data and audio data conforming to predetermined data formats. A memory 110 is used to temporarily store the video data and the audio data generated by the video/audio processing unit 109.

An audio level detecting unit 111 detects an audio level L indicating the level of the sound collected by the microphone unit 107, and supplies the detected audio level L to the control unit 106.

An operating unit 112 includes a trigger key for selectively changing between the recording start and the temporary recording halt. When a recording start is instructed by the trigger key of the operating unit 112, the control unit 106 begins the recording of images and sounds.

The processing performed by the DVC 100 will now be described while referring to FIG. 2. The processing in FIG. 2 is initiated when the DVC 100 begins the recording of images and sounds.

Step S201: The audio level detecting unit 111 detects the audio level L indicating the level of sounds collected by the microphone unit 107, and transmits the detected audio level L to the control unit 106.

Step S202: The control unit 106 determines whether the audio level L is higher than a first standard level L1, and if L>L1 is established, the control unit 106 starts the process at step S203. Whereas when L≦L1 is established, the control unit 106 starts the process at step S204.

Step S203: If L>L1 is established, it is assumed that the level of noise generated in the recording unit 105 is satisfactorily smaller than the level of the sounds collected by the microphone unit 107, and that it has almost no effect on the collected sounds. Therefore, in this case, the control unit 106 changes the rotational speed of the spindle motor 103 to the standard speed V0.

Step S204: The control unit 106 determines whether the audio level L is higher than a second standard level L2 (L2<L1). If L>L2 is established, the control unit 106 begins the process at step S205. Whereas when L≦L2 is established, the control unit 106 begins the process at step S206.

Step S205: In order to reduce the level of the noise generated within the recording unit 105, the control unit 106 generates a control signal to select the first low speed V1 (V1<V0) as the rotational speed for the spindle motor 103, and transmits the control signal indicating the selected speed to the driver 104. The driver 104 then changes the rotational speed of the spindle motor 103 to the first low speed V1 to reduce the noise produced by the spindle motor 103 and the air-resistance noise produced by the spinning disk medium 101, and the control unit 106 adjusts a data reading speed, i.e., changes to a reading speed corresponding to V1 the speed at which data is read from the memory 110. Through this processing, since the level of noise generated by the recording unit 105 can be reduced until it is lower than the level of the sounds collected by the microphone unit 107, high quality sounds can be recorded by the DVC 100.

Step S206: In order to reduce the level of noise generated within the recording unit 105, the control unit 106 generates a control signal to select the second low speed V2 (V2<V1) as the rotational speed for the spindle motor 103 and transmits the control signal indicating the selected speed to the driver 104. The driver 104 then changes the rotational speed of the spindle motor 103 to the second low speed V2 to reduce the noise produced by the spindle motor 103 and the air-resistance noise produced by the spinning disk medium 101, and the control unit 106 adjusts the data reading speed, i.e., changes to a recording speed corresponding to V2 the speed at which data is read from the memory 110. Through this processing, since the level of noise generated within the recording unit 105 can be reduced until it is lower than the level of the sounds collected by the microphone unit 107, high quality sounds can be recorded by the DVC 100.

As is described above, according to the DVC 100, since the rotational speed of the spindle motor 103 can be changed in accordance with the level of the sounds collected by the microphone unit 107, noise generated by the recording unit 105, such as the noise produced by the spindle motor 103 and the air-resistance noise produced by the spinning disk medium 101, can be reduced until it is smaller than the collected sounds, and high-quality recording of sounds can be performed.

(Second Embodiment)

Figure 3:
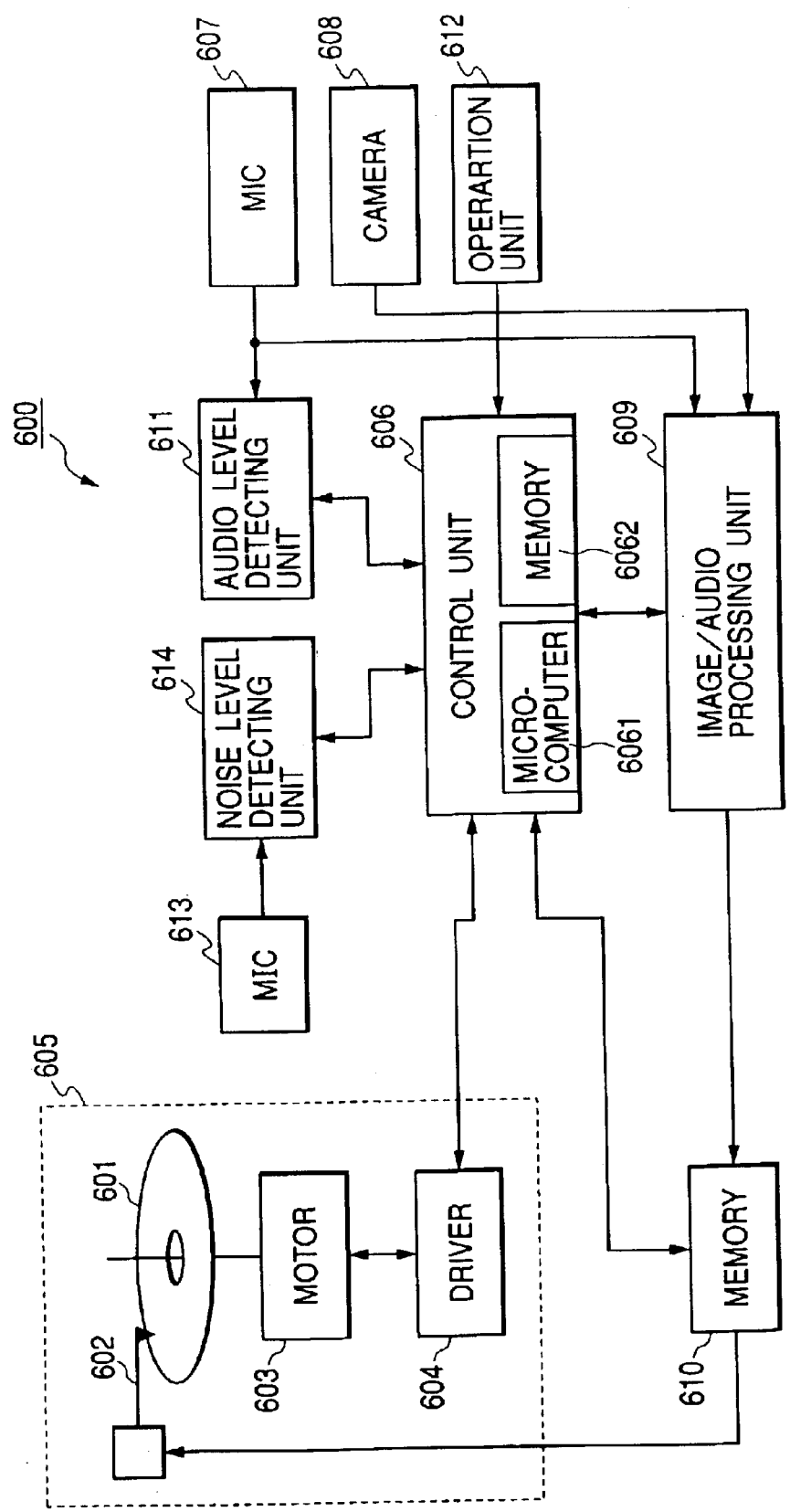
FIG. 3 is a diagram showing the essential configuration of a recording apparatus according to a second embodiment.
Figure 4:
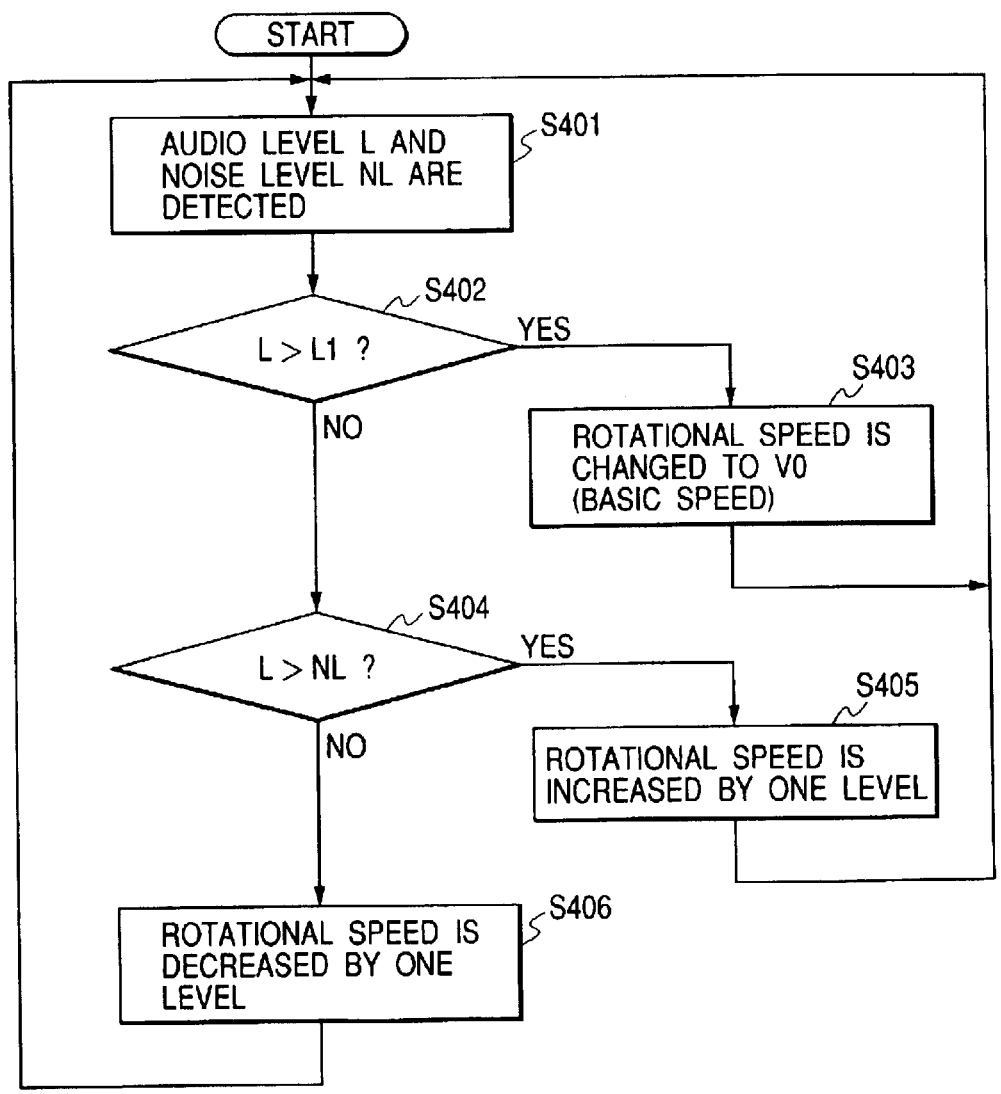
FIG. 4 is a flowchart showing the processing performed by the recording apparatus in FIG. 3.

A recording apparatus according to a second, preferred embodiment of the present invention will now be described while referring to FIGS. 3 and 4.

First, the essential configuration of the recording apparatus in the second embodiment will be described while referring to FIG. 3.

A digital video camera (hereinafter referred to as a DVC) 600 is a preferred recording apparatus for the second embodiment.

A recording unit 605 includes a disk medium 601 such as a magnetic disk or an optical disk, a recording head 602, a spindle motor 603 and a driver 604. The recording head 602 records video data and audio data on the disk medium 601, which is rotated by the spindle motor 603. For the spindle motor 603, the driver 604 controls the rotational speed. The rotation speeds are a standard speed V0, a first low speed V1 slower than the standard speed V0, and a second low speed V2, slower than the first low speed V1. A function of the driver 604 provides for the changing of the rotational speed of the spindle motor 603 in accordance with the noise level (e.g., the noise produced by the spindle motor 603 and the air-resistance noise produced by a spinning disk medium 601) generated by the recording unit 605.

A control unit 606 including a microcomputer 6061 and a memory 6062 controls various functions of DVC 600. A control program to be executed by the control unit 606 is stored in the memory 6062 of the control unit 606, and a control program that implements the processing in FIG. 4 is also stored in the memory 6062 of the control unit 606.

A microphone unit 607 collects external sounds, a camera unit 608 takes in images and a video/audio processing unit 609 converts the sounds collected by the microphone unit 607 and the images obtained by the camera unit 608 to obtain video data and audio data conforming to predetermined data formats. A memory 610 is used to temporarily store the video data and the audio data generated by the video/audio processing unit 609.

An audio level detecting unit 611 detects an audio level L indicating the level of the sound collected by the microphone unit 607, and supplies the detected audio level L to the control unit 606.

An operating unit 612 includes a trigger key for selectively changing between the recording start and the temporary recording halt. When a recording start is instructed by the trigger key of the operating unit 612, the control unit 606 begins the recording of images and sounds.

A microphone unit 613 collects noise generated by the recording unit 605, such the noise produced by the spindle motor 603 when it is driven and the air-resistance noise produced by the spinning disk medium 601. A noise level detecting unit 614 detects a noise level NL indicating the level of the noise collected by the microphone unit 613.

The processing performed by the DVC 600 will now be described while referring to FIG. 4. The processing in FIG. 4 is initiated when the DVC 600 begins the recording of images and sounds.

Step S401: The audio level detecting unit 611 detects the audio level L indicating the level of sounds collected by the microphone unit 607, and transmits the detected audio level L to the control unit 606. Further, the noise level detecting unit 614 detects the noise level NL indicating the level of the noise collected by the microphone unit 613, and notifies the control unit 606 of the detected noise level NL.

Step S402: The control unit 606 determines whether the audio level L is higher than a first standard level L1, and if L>L1 is established, the control unit 606 starts the process at step S403. Whereas when L≦L1 is established, the control unit 606 starts the process at step S404.

Step S403: If L>L1 is established, it is assumed that the level of noise generated in the recording unit 605 is satisfactorily smaller than the level of the sounds collected by the microphone unit 607, and that it has almost no effect on the collected sounds. Therefore, in this case, the control unit 606 changes the rotational speed of the spindle motor 603 to the standard speed V0.

Step S404: The control unit 606 compares the audio level L with the noise level NL to determine whether the audio level L is higher than the noise level NL. If L>NL is established, the control unit 606 begins the process at step S405. Whereas when L≦NL is established, the control unit 606 begins the process at step S406.

Step S405: The control unit 606 selects, for the spindle motor 603, a rotational speed higher by one level, and transmits that the selected speed is increased by one level to the driver 604. Thereafter, the driver 604 increases one level the rotational speed of the spindle motor 603, while the control unit 606 adjusts a data reading speed, i.e., increases one level the speed at which data is read from the memory 610.

Step S406: In order to reduce the level of the noise generated within the recording unit 605, the control unit 606 selects, for the spindle motor 603, a rotational speed lower by one level, and transmits that the selected speed is decreased by one level to the driver 604. The driver 604 then decreases one level the rotational speed of the spindle motor 603 to reduce the noise produced by the spindle motor 603 and the air-resistance noise produced by the spinning disk medium 601, and the control unit 606 adjusts a data reading speed, i.e., decreases one level the speed at which data is read from the memory 610. Through this processing, since the level of noise generated by the recording unit 605 can be reduced until it is lower than the level of the sounds collected by the microphone unit 607, high quality sounds can be recorded by the DVC 600.

As is described above, according to the DVC 600, since the rotational speed of the spindle motor 603 can be changed in accordance with the level of the sounds collected by the microphone unit 607 and the level of the noise collected by the microphone unit 613, noise generated by the recording unit 605, such as the noise produced by the spindle motor 603 and the air-resistance noise produced by the spinning disk medium 601, can be reduced until it is smaller than the collected sounds, and high-quality recording of sounds can be performed.

The above-described preferred embodiments are merely exemplary and are not to be construed as limiting the scope of the present invention.

The scope of the present invention is defined by the scope of the appended claims, and is not limited to the specific descriptions contained in this specification. Furthermore, all modifications and changes applying to equivalents of the claims are considered to fall within the scope of the present invention.

What is claimed is:

1. A recording apparatus comprising:
   a microphone unit; and
   a drive unit adapted to drive a disk medium on which sounds collected by the microphone unit is to be recorded,
   wherein the recording apparatus is capable of changing a rotational speed of the drive unit in accordance with a level of the sound collected by the microphone unit.

2. A recording apparatus according to claim 1, wherein the drive unit has a first rotational speed, a second rotational speed slower than the first rotational speed, and a third rotational speed slower than the second rotational speed, and
   the recording apparatus is capable of changing a rotational speed of the drive unit to the first, the second or the third rotational speed in accordance with a level of the sound collected by the microphone unit.

3. A recording apparatus according to claim 1, wherein the recording apparatus is a digital video camera.

4. A recording apparatus according to claim 1, wherein the recording apparatus is capable of changing a rotational speed of the drive unit in accordance with a level of the sound collected by the microphone unit so as to lower a level of noise being generated by the drive unit and record high quality sound on the disk medium.

5. A recording apparatus comprising:
   a first microphone unit;
   a drive unit adapted to drive a disk medium on which sounds collected by the first microphone unit are to be recorded; and
   a second microphone unit for collecting noise generated by the drive unit,
   a drive unit adapted to drive a disk medium on which sounds collected by the microphone unit is to be recorded,
   wherein the recording apparatus is capable of changing a a rotational speed of the drive unit in accordance with a level of the sound collected by the first microphone unit and a level of the noise collected by the second microphone unit.

6. A recording apparatus according to claim 5, wherein
   the drive unit has a first rotational speed a second rotational speed slower than the first rotational speed and a third rotational speed slower than the second rotational speed, and
   the recording apparatus is capable of changing a rotational speed of the drive unit to the first, the second or the third rotational speed in accordance with a level of the sound collected by the first microphone unit and a level of the noise collected by the second microphone unit.

7. A recording apparatus according to claim 5, wherein the recording apparatus is a digital video camera.

8. A recording apparatus according to claim 5, wherein the recording apparatus is capable of changing a rotational speed of the drive unit in accordance with a level of the sound collected by the first microphone unit and a level of the noise collected by the second microphone unit so as to lower a level of noise being generated by the drive unit and record high quality sound on the disk medium.

9. A rotational speed changing method which is used in a recording apparatus including a microphone unit; and a drive unit adapted to drive a disk medium on which sound collected by the microphone unit is to be recorded, the rotational speed changing method comprising:
   a changing step of changing a rotational speed of the drive unit in accordance with a level of the sound collected by the microphone unit.

10. A rotational speed changing method according to claim 9, wherein the drive unit has a first rotational speed, a second rotational speed slower than the first rotational speed, and a third rotational speed slower than the second rotational speed, and the changing step is capable of changing a rotational speed of the drive unit to the first, the second or the third rotational speed in accordance with the level of the sound collected by the microphone unit.

11. A rotational speed changing method according to claim 9, wherein the recording apparatus is a digital video camera.

12. A rotational speed changing method according to claim 9, wherein the changing step is capable of changing a rotational speed of the drive unit in accordance with a level of the sound collected by the microphone unit so as to lower a level of noise being generated by the drive unit and record high quality sound on the disk medium.

13. A rotational speed changing method which is used in a recording apparatus including a first microphone unit; a drive unit adapted to drive a disk medium on which sound collected by the first microphone unit is to be recorded; and a second microphone unit for collecting noise generated by the drive unit, the rotational speed changing method comprising:

a changing step of changing a rotational speed of the drive unit in accordance with a level of the sound collected by the first microphone unit and a level of the noise collected by the second microphone unit.

14. A rotational speed changing method according to claim 13, wherein the drive unit has a first rotational speed, a second rotational speed slower than the first rotational speed, and a third rotational speed slower than the second rotational speed, and the changing step is capable of changing a rotational speed of the drive unit to the first, the second or the third rotational speed in accordance with a level of the sound collected by the first microphone unit and a level of the noise collected by the second microphone unit.

15. A rotational speed changing method according to claim 13, wherein the recording apparatus is a digital video camera.

16. A rotational speed changing method according to claim 13, wherein the changing step is capable of changing a rotational speed of the drive unit in accordance with a level of the sound collected by the first microphone unit and a level of the noise collected by the second microphone unit so as to lower a level of noise being generated by the drive unit and record high quality sound on the disk medium.

* * * * *

UNITED STATES PATENT AND TRADEMARK OFFICE
CERTIFICATE OF CORRECTION

| | |
|---|---|
| PATENT NO. | : 7,054,248 B2 |
| APPLICATION NO. | : 10/366825 |
| DATED | : May 30, 2006 |
| INVENTOR(S) | : Tetsuva Wakui |

It is certified that error appears in the above-identified patent and that said Letters Patent is hereby corrected as shown below:

Column 1, line 59, delete "rotational speedc" and insert --rotational speed--

Signed and Sealed this

Twenty-first Day of November, 2006

JON W. DUDAS
*Director of the United States Patent and Trademark Office*